May 28, 1957   G. A. GRANITSAS   2,793,585
EMBOSSING DIES AND METHOD OF MAKING SAME
Filed June 26, 1953                 2 Sheets-Sheet 1

INVENTOR
GEORGE A GRANITSAS
BY
ATTORNEYS

May 28, 1957 G. A. GRANITSAS 2,793,585
EMBOSSING DIES AND METHOD OF MAKING SAME
Filed June 26, 1953 2 Sheets-Sheet 2
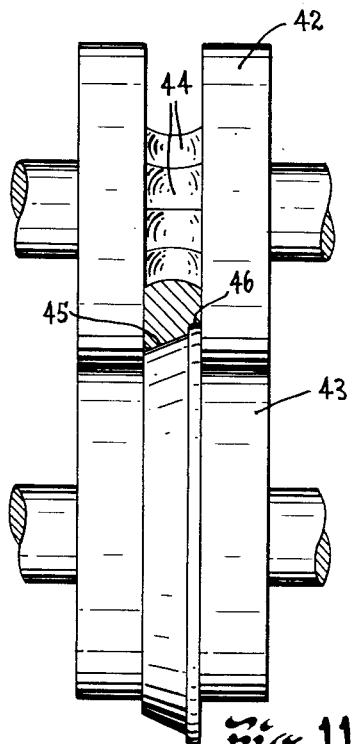
Fig. 11
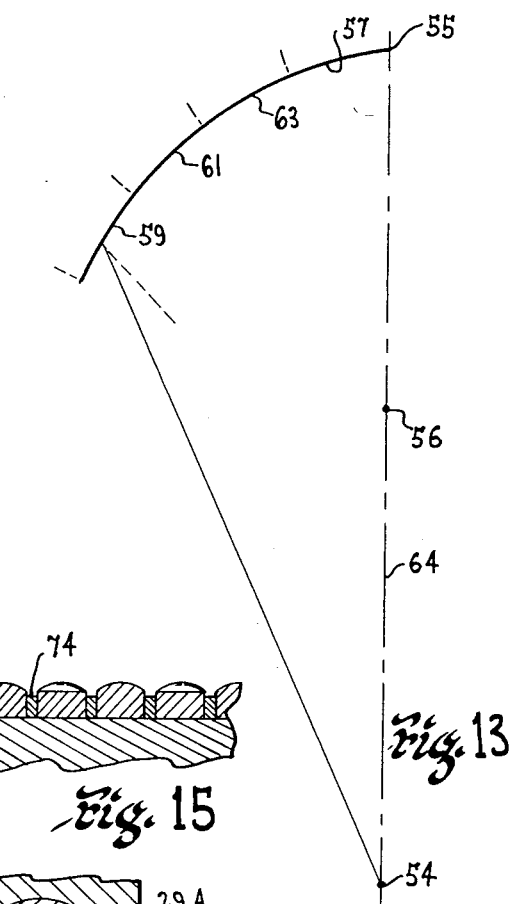
Fig. 13
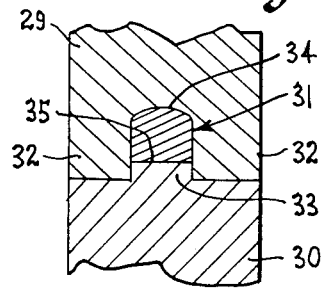
Fig. 9
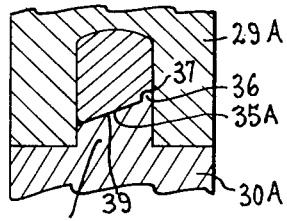
Fig. 10
Fig. 15
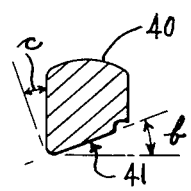
Fig. 12
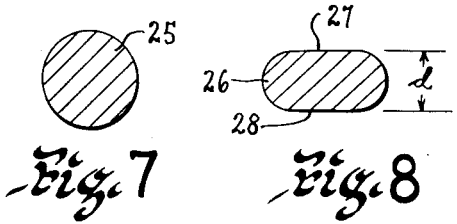
Fig. 7  Fig. 8
INVENTOR
GEORGE A. GRANITSAS
BY Louis L. Gagnon
Noble S. Williams
ATTORNEYS

United States Patent Office 2,793,585
Patented May 28, 1957

2,793,585

EMBOSSING DIES AND METHOD OF MAKING SAME

George A. Granitsas, Marlboro, Mass., assignor to American Optical Company, Southbridge, Mass., a voluntary association of Massachusetts Application June 26, 1953, Serial No. 364,429

5 Claims. (Cl. 101—28)

This invention relates to embossing dies and has particular reference to the provision of a novel construction of die and method of making the same.

One of the principal objects of the invention is to provide an embossing die for producing a surface of a controlled texture on an article and novel method of making said dies.

Another object is to provide an embossing die having a plurality of individual unit areas throughout the working surface thereof each unit area having controlled surface shape, and novel method of making the same.

Another object is to provide an embossing die having a cylindrical base and a plurality of contiguously related convolutions of wire wound thereon, each of said convolutions having on the outer side thereof progressively arranged convexly curved individual unit areas whereby the contiguous relation of the convolutions will cause said individual unit areas to assume a side by side relation with each other to produce an extended working surface of specially and carefully controlled configuration.

Another object is to provide an embossing die of the above character having a supporting base and a plurality of adjacent unit areas each of controlled similar surface configuration and wherein said unit areas may each be disposed in predetermined angular relation with respect to said base so as to face in a desired common direction and thereby provide an embossing surface of controlled texture, and novel method of making same.

Another object is to provide a simple, efficient and unexpensive method of obtaining a large area of controlled surface texture.

Other objects and advantages of the invention will become apparent from the following description taken in connection with the accompanying drawings, and it will be apparent that many changes may be made in the details of construction, arrangement of parts and steps of the method shown and described without departing from the spirit of the invention as expressed in the accompanying claims. I, therefore, do not wish to be limited to the exact details of construction, arrangement of parts and method shown and described as the preferred forms only have been given by way of illustration.

Referring to the drawings,

Figs. 7 and 8 are sectional views illustrating steps in the method of fabrication of the embossing means;

Figs. 9 and 10 are enlarged fragmentary sectional views illustrating modified forms of dies;

Fig. 11 is a side elevational view of surface forming dies illustrating a step in the method of fabrication;

Fig. 12 is a sectional view illustrating another step in the method of fabrication of the embossing means;

Fig. 13 is a diagrammatic plan view of a wide angle optical projection system utilizing a screen whose surface texture may be formed by the device embodying the invention;

Fig. 15 is a fragmentary sectional view similar to Fig. 4 but showing a modification thereof.

The intended use of the device embodying the invention is in forming on a supporting surface of an article a plurality of closely related separate unit areas each having a controlled surface shape and, if desired, collectively having the separate surface areas thereof all facing in a common direction in predetermined angular relation with reference to said supporting surface.

Referring more particularly to the drawings wherein like characters of reference designate like parts throughout the several views an embossing cylinder or roller embodying the invention as shown in Figs. 1 through 5 comprises a cylindrical base portion 15 having on a supporting surface thereof closely wound convolutions of wire 16. This wire has on the outer face thereof progressively or successively arranged individual unit areas each of controlled surface shape which shape, in this particular instance, is convexly spherically curved to extend throughout the width of the wire and a plurality of these curves extend in progressive sequence along the length of the wire.

Figure 1:
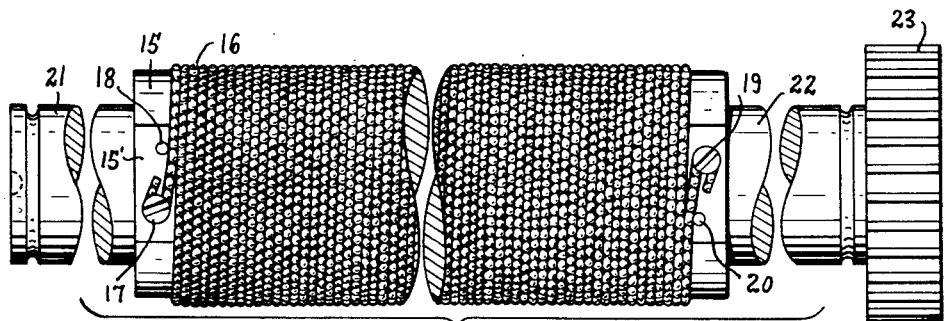
Fig. 1 is a side elevational view of an embossing die embodying the invention.
Figure 2:
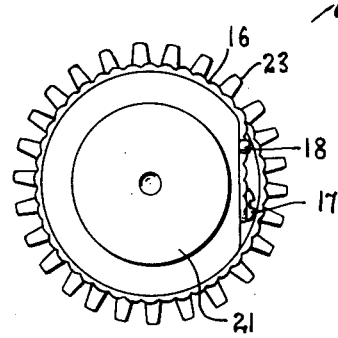
Fig. 2 is an end view of the embossing die illustrated in Fig. 1.

The convolutions are preferably formed by looping one end of the wire 16 and anchoring it to a flattened portion 15' adjacent one end of the base 15 by a screw or other suitable means 17. A pin 18 is provided in spaced relation with the anchoring means 17 to insure that the convolutions remain in closely adjacent relation. The wire 16, as shown in Fig. 1, is wound tightly on the cylindrical base 15 to form convolutions in a contiguous relation with each other throughout the greatest part of the length of said base 15 and has its opposed end similarly anchored to a second similar flattened portion of said base adjacent the opposite end thereof by a screw 19 or other suitable anchoring means. Again a pin or other suitable means 20 is provided to insure that the convolutions remain in desired contiguous relation. Each flattened portion is merely of such limited size as to conveniently accommodate the securing means, the guide pin and the bent end portion of the wire 16 associated therewith so as to be within the wide cylindrical working surface formed by the convolutions and thus normally out of contact with the sheet material being rolled. Thus it will be appreciated that all parts of the convolutions of the wire 16 between the bent angled end portions thereof will be supported by the wide cylindrical surface of the base 15 intermediate the spaced flattened portion 15'. The cylindrical base is provided with opposed stems 21 and 22 concentric therewith which function as bearing shafts and has a gear 23 keyed on one end thereof by which means it may be rotated by suitable mechanism not shown.

Figure 3:
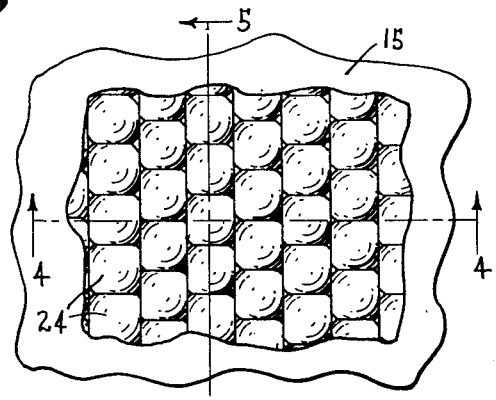
Fig. 3 is an enlarged fragmentary face view of a small portion of the surface area of the embossing die illustrated in Fig. 1.

An enlarged fragmentary plan view of a portion of the working surface of the embossing roll of Fig. 1 is shown by Fig. 3 having individual unit surface areas 24 and a transverse sectional view thereof (see Fig. 4) shows a number of adjacent convolutions of the wire and the transverse convex spherical surface curvatures thereon.

Figure 5:
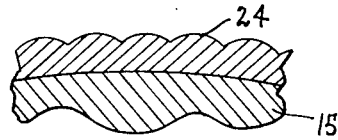
Fig. 5 is a fragmentary sectional view taken on line 5—5 of Fig. 3 and looking in the direction indicated by the arrows.

A longitudinal sectional view of this working surface appears in Fig. 5 and shows the successive convex spherical surface portions on a portion of a single convolution. The wire 16, although described in detail herein as having progressively arranged or successively arranged separate convexly spherically curved unit surface areas, might be provided with unit areas of many other different desired shapes following the teaching of the invention as will appear hereinafter.

When forming the surface-shaped wire 16 to be used upon the cylindrical die 15 of Fig. 1 the wire, as illustrated in Figs. 7 through 12, initially has a circular cross-section as shown at 25 in Fig. 7. It is then placed between a pair of plain rolling dies, suitably spaced, and formed to a cross-sectional shape, such as that shown at 26 in Fig. 8; it being understood, of course, that the spacing between the surfaces of the rolling dies is controlled to produce a predetermined distance $d$ between the flat surfaces 27 and 28 of the wire.

The wire is then drawn through a set of "breakdown" rolling dies 29 and 30 the former of which has a circular recess therein formed by a pair of circular flanges spaced from each other an amount approximately equal to the dimension $d$ of the wire and the other of which has a circular mating flange of a suitable width to be received in the recess. A recess is indicated at 31 (Fig. 9), a pair of flanges at 32 and a mating flange at 33. The bottom surface 34 of the recess and the top surface 35 of the mating flange, respectively, having their surface shapes controlled to produce the approximate cross-sectional shape desired in the wire at this intermediate stage in the process, as for example, that shown by the sectioned wire in Fig. 9, or in Fig. 10. The wire at the time of leaving the "breakdown" dies 29 and 30 of Fig. 9 or the dies 29A and 30A of Fig. 10, as the case may be, would differ mainly in the transverse angle or slope provided of its bottom surface. The purposes for such a slope or angle and the amount thereof will be later described.

In Fig. 10, wherein a transverse slope of appreciable angle is to be given to the bottom surface of the wire 16, it is desirable not only to slope the top surface 35A of the mating flange 33A on the lower die but also to provide a circumferential bead 36 adjacent the "high" side of the flange, and to round the outer surface of this bead somewhat as shown. The reason for this arrangement using the bead 36 is because it is at this part of the wire more than at any other part thereof that the material of the wire will be subjected to the greatest pressures and the greatest deformation and when the metal or material of which the wire is formed, is upset or caused to "flow" to such an extent, it is most probable that some "flash," as indicated at 37, may be formed in or near the adjacent joint between the dies 29A and 30A. This is particularly true if anything more than minimum clearance between the dies exists and for proper mechanical working conditions some clearance between dies must be provided. Obviously any flash if it projected downwardly beyond the plane of the sloping bottom surface 39 of the wire would be objectionable for it would prevent the wire from seating properly upon the surface of the roller 15. Thus the die 30A is formed with the bead 36 to space any such flash which might form above the plane of the sloping bottom surface. The dies in Figs. 9 or 10, are formed so as to produce a plain or smooth top surface extending longitudinally of the wire with this surface being curved transversely substantially to the cross-sectional shape desired.

The wire of approximately the cross section desired is then drawn through a set of roller dies such as shown in Fig. 11 to produce the separate progressively arranged unit areas of convex spherical shape on its top or front surface 40 and to simultaneously form (see Fig. 12) the undersurface 41 with the exact angle $b$ desired. The dies which produce the final surface characteristics desired on the wire, as shown in Figs. 3, 4, 5 and 6 may be termed surface-contouring or surface-forming dies and are indicated by the numerals 42 and 43 in Fig. 11.

The shape of the final convex working surface 24 of a unit area is controlled by providing the die 42 with a circumferential series of concave areas 44 which are controlled in size and shape so as to finally produce the exact outer surface configuration desired on the wire. The other conturing die 43 has a sloping flange-like portion 45 much like that of die 30 or 30A for providing the outer surface shape desired on the underside of the finished wire. In the instant disclosure, this surface is angled as much as 25° or more (or the angle could be a less predetermined amount), as shown at $b$. It is to be understood that the shape or slope of the annular flange portion 33A may be varied as desired or may be flat, as shown at 33 in Fig. 9, when no angle is desired. The bead is numbered 46.

The wire employed for forming the working surface of the embossing die may be nickel silver, phosphor bronze, beryllium copper, or other suitable metal. It is preferably cold rolled to the final shape desired, and when formed of beryllium copper and after being wound on the cylindrical base 15, as shown in Fig. 1, may be subjected to a heat treatment of temperature ranging from between 550° F. to 650° F. for a period of from one to three hours to age-harden the same. This age-hardening will not only cause the convolutions of the wire to assume a more intimate fit with the cylindrical base 15 but will also greatly prolong the life and durability of the embossing die.

Figure 4:
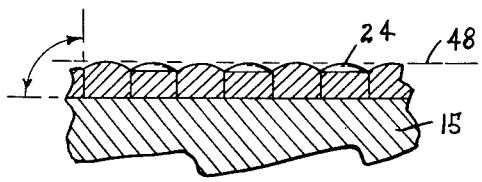
Fig. 4 is a fragmentary sectional view taken as on line 4—4 of Fig. 3 and looking in the direction indicated by the arrows.
Figure 6:
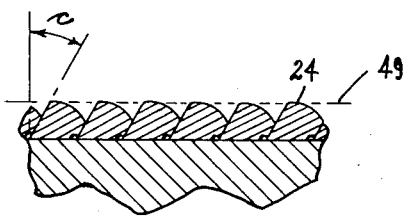
Fig. 6 is a view generally similar to Fig. 4 showing a modification thereof.

It is pointed out that when the wire has a flat undersurface, as shown at 35 in Fig. 9, the separate unit areas 24 thereof will lie in the same general plane as illustrated by the dotted line 48 in Fig. 4. If the undersurface of the wire is angled, as shown at 41 in Fig. 12, the slope of the undersurface of the wire, when being wound on the cylindrical base 15, will cause the separate outer surface areas, as shown in Fig. 6, to be angled relative to their common outermost plane illustrated by the dash lines 49 by the angle $c$. This angle is equal to the angle $b$ which is formed on the base 41, and may be increased or decreased as desired by changing the degree of slope or angle of the effective surface of the die 30 or 30A.

Although the embossing die described above may have general applications in forming extended surfaces of different desired textures in accordance with the shape provided at 44 on die 42, the detailed characteristics of the embossing die set forth herein are particularly adaptable for forming optical projection screens, whereby the large number of the convex spherically shaped unit areas formed longitudinally of the wire will produce on the material to be surface textured thereby a plurality of closely arranged related concave cavities having controlled optical characteristics.

When forming curved projection screens in order to eliminate the tendency of light impinging on certain portions of the screen and being reflected to other portions thereof and thereby reduce the definition of image of the picture thereon, it is desirable to angle the unit areas in certain parts, at least, of such a screen in such a manner as to direct the reflected light away from the other surface portions of the screen and to have same as usable light reaching the audience before the screen. This is particularly desirable when the projection screen has an arcuate shape of appreciably wide angle. This controlling of the angle of the unit reflecting areas of the screen is brought about by angling the undersurface 41 of the wire as stated above, thereby causing the surface portions of the die which form the unit areas in the screen material to be angled accordingly. Although the undersurface 41 has been illustrated as being angled in only one direction (to the left), it is to be understood that it might be angled in like manner but in the opposite direction (to the right).

Referring to Fig. 13, it will be seen that a wide angle optical projection system preferably of the specularly reflecting type is diagrammatically shown. An associated projection system may comprise a projector positioned at a point 54 for directing a wide angle picture onto a cylindrically curved screen 55 (only approximately half of which is shown) so that pictures formed thereon may be advantageously viewed by an audience positioned generally between the screen and projection point 54 and generally about the point 56, which is the approximate center of curvature of the screen 55. It will be appreciated that an angle of approximately 120° is disclosed for wide angle screen 55. In wide angle projection systems some stray light from one part of the screen may, if proper care is not exercised, be reflected to other parts of the screen and cause deterioration of image at such other locations to varying degrees depending upon the particular reflective characteristics of the surface thereof.

Light projected on to a nearly central area 57 of the screen from the point 54 will be reflected generally back in nearly the direction from which it has come. However some stray light from this area 57 might reach side areas of the screen if not positively prevented. Likewise light from side area 59 would most certainly deteriorate the central area 57 if not prevented. Furthermore, in order that the light at any point on the screen may be seen from an appreciable but controlled angle horizontally within the audience, it has been found desirous to provide a specularly reflecting surface for the screen 55 and to carefully control this surface by the use of a great number of unit areas of concave spherical shape with the individual concavities thereof of such effective radius as to provide this appreciable viewing angle and at the same time positively preventing said deterioration. Each of such concavities will reflect substantially all of the light received thereby outwardly therefrom and within this viewing area and should prevent such objectional stray light if they are of suitable curvature and if they face in a proper direction. All of the concavities obviously should be sufficiently small so that they are beyond the ability of resolution of persons seated at the nearest points within the audience area.

In order to care for such a condition and provide pictures on the screen of good contrast, the surface texture for the screen area 55 should have all of its concavities arranged so that they face generally toward the audience area and the projector. Sheet material having such concavities some of which are arranged to face forwardly and others angled various amounts, as desired, may be accomplished by following the teachings of the invention, and particularly as shown by Figs. 4 and 6. In one figure, the embossing die has been carefully controlled to provide the angle or slope $c$ desired in accordance with the shape and dimensions of the theater screen employed and in accordance with the projection distance employed in said theater. It will be appreciated all concavities in the central area 57 should face generally in the direction of the points 56 and 54, concavities in the outer area 59 should similarly face in such a general direction as to receive the light from point 54 and direct it with appreciable controlled horizontal angular value toward point 56, and areas 61 and 63 intermediate the center and edge portions of the screen would likewise be provided with concavities facing or angled desired intermediate amounts in accordance with the prevailing conditions. In Fig. 13, the half portion of the screen 55 has been, for the present disclosure, divided into four different vertically extending areas each having the concavities thereof arranged at different angles. A greater or less number of differing areas could be employed.

Figure 14:
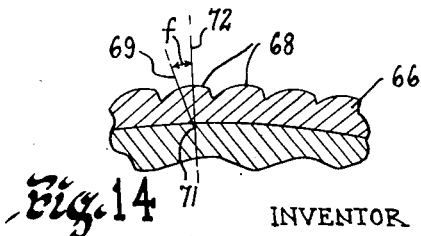
Fig. 14 is a fragmentary sectional view similar to Fig. 5 but showing a modification thereof.

In Fig. 14 is shown a longitudinally disposed portion of a contoured wire 66 upon the cylindrical base 15, but this wire differs from the contoured wire of Fig. 5 in that adjacent convex surfaces 68 formed thereon are pitched circumferentially slightly to one side as indicated by the angle $f$ included between each radial line 69 passing through the respective center of curvature 71 of the unit area and the longer radius 72 of the cylindrical base 15 passing through the point 71. The purpose of such a modified arrangement is to provide in the sheet material rolled thereby spherical concavities which may be caused to face downwardly a predetermined amount so as to more nearly face the audience area in cases wherein an appreciable vertical angle may exist between a line if sight from the center of the audience and the center of the screen and the projection axis in the theater.

Fig. 15 shows wherein the convolutions on the support 15 may be at times spaced slightly by a thin spacing wire 74 if deeper or more completely separated rows of concavities are desired in the textured sheet material.

Although the separate areas have been described as having a convex substantially spherical shape, they may be formed to toric shapes wherein ether the transverse meridian or the longitudinal meridian thereof has the greater curvature. Other convex shapes, at times, might be desirable.

It will be seen, therefore, that the embossing die embodying the invention readily lends itself to the manufacture of elongated strips of sheet material having surface texture of carefully controlled formation, which strips may be placed in side-by-side relation to form a wide angle projection screen and with the concavities of the strip material nearest the center of the screen facing normally in the direction of the projection, and with concavities of the strip material further disposed from a projection axis 64 through points 54 and 56 being of increased angular value so as to provide a wide angle screen having high reflective efficiency for a predetermined audience area with very little stray light resulting therefrom and being directed to other parts of the screen.

Although the unit areas, as shown in Fig. 3, are illustrated in laterally nonaligned relation with each other, obviously, these areas might assume a side-by-side relation or various other different relations with each other, such depending, for example, upon the diameter of the cylindrical base 15, the selected unit area size, space between adjacent areas longitudinally of the wire 16 and the tightness of the coils of wires on the cylindrical base and yet produce the equivalent overall desired effect.

From the foregoing description, it will be seen that simple, efficient and economical means and method have been provided for accomplishing all of the objects and advantages of the invention.

Having described my invention, I claim:

1. The method of forming an embossing die comprising forming a relatively long strand of wire of beryllium copper with progressively related unit areas of controlled contour shape and surface configuration, securing one end of said wire to a cylindrically shaped base member, rotating said base member to form a plurality of contiguously related convolutions of said wire on said base member in the direction of the longitudinal axis thereof, securing the free end of the last convolution to said base member to cause said unit areas to be progressively disposed circumferentially and throughout the width of said plurality of convolutions and heating said base member with the convolutions thereon to a temperature between 550° and 650° F. to age harden said convolutions and to cause said convolutions to shrink into intimately fitted relation with said base member.

2. The method of forming an embossing die for use in forming upon a surface of plastic sheet material or the like of appreciable length and width a very large number of very small closely positioned unit areas of substantially identical shape so as to possess like optical properties for collectively directing most of the light received from a source of illumination at a distance therefrom generally in a predetermined direction, said method comprising forming a relatively long strand of wire to a substantially rectangular sectional shape, forming on the outer surface of said wire and along the length thereof a plurality of progressively disposed closely related like unit areas of controlled size and smooth curved surface configuration and simultaneously forming upon the under side of said wire a flat surface having a controlled angle of sidewise tilt relative to the outer surface thereof, winding said wire on a cylindrically shaped base member in such manner as to produce contiguously related convolutions having the unit areas on said wire disposed on the outer sides of said convolutions, and said unit areas, in addition to being arranged in progressive sequence longitudinally of said wires, being also arranged in an adjacent side-by-side relation with each other throughout the width of said plurality of convolutions, and with the unit areas on each convolution being laterally angularly tilted a predetermined amount with respect to said base in accordance with the angle of tilt provided the under surface of the wire, and securing said convolutions to said cylindrically shaped base member in said relation.

3. An embossing die of the character described comprising a cylindrically shaped base member, a first wire having a plurality of convolutions tightly wound upon said base member and having its opposite ends secured to said base member, said first wire having on the outer surface thereof a plurality of longitudinally arranged spherically curved convex unit areas of controlled size and surface configuration, said first wire further having a transversely flat under surface extending lengthwise of said under surface and being disposed in a predetermined position upon said first wire relative to the unit areas on said outer surface, and a second wire of a smaller predetermined transverse dimension wound upon said base member and having the convolutions thereof disposed in closely adjacent side-by-side relation to and between the convolutions of said first wire, whereby said closely adjacent convolutions of said first and second wires will jointly provide upon said cylindrically shaped base member an effectively wide circumferential die working surface of rows of convex unit areas spaced a small predetermined distance from one another.

4. An embossing die for use in impressing into the surface of sheet material of appreciable length and width a multiplicity of relatively small closely positioned concavely curved unit areas of substantially identical predetermined shapes, and with all of said areas being oriented in like predetermined angular relation relative to the general plane of said sheet material, whereby when said sheet material is used as a projection screen and arranged at a preselected distance from an associated projector substantially all of the light received thereby will be reflected generally toward an audience area in front of said screen, said embossing die being in the form of a roller having a cylindrically shaped base member of appreciable length and diameter, and having a relatively long preformed wire-like element wound thereon so as to provide a relatively large number of like convolutions in contiguous relation to each other and together constituting an exposed annular working surface for said die, said wire-like element being of such preformed shape as to have a pair of flat side walls disposed in spaced parallel relation to each other, a flat inner side engaging said base member and arranged in predetermined angular relation relative to said side walls, and an outer side having an extended series of like convexly curved projections progressively disposed therealong and in closely adjacent longitudinally aligned relation to each other, each of said convexly curved projections having smooth curvatures considered both in the longitudinal and transverse directions thereof, and in the transverse direction thereof said curvature extending substantially the entire width of said element from side wall to side wall thereof.

5. An embossing die as defined in claim 4, and wherein the convexly curved projections thereof are spherically shaped projections.

References Cited in the file of this patent

UNITED STATES PATENTS

| | | |
|---|---|---|
| 632,577 | Latty | Sept. 5, 1899 |
| 720,580 | Greenfield | Feb. 17, 1903 |
| 1,181,971 | Lovell | May 2, 1916 |
| 1,228,191 | Dulany | May 29, 1917 |
| 1,376,083 | Durhan | Apr. 26, 1921 |
| 1,437,009 | Perkins | Nov. 28, 1922 |
| 1,476,015 | Julian | Dec. 4, 1923 |
| 1,501,246 | Soderberg | July 15, 1924 |
| 1,879,237 | Heymer | Sept. 27, 1932 |
| 2,042,537 | Liddell | June 2, 1936 |
| 2,191,441 | Campbell | Feb. 27, 1940 |
| 2,315,721 | Martin | Apr. 6, 1943 |
| 2,367,005 | Clarke | Jan. 9, 1945 |
| 2,562,077 | Winnek | July 24, 1951 |

FOREIGN PATENTS

| | | |
|---|---|---|
| 251,811 | Germany | Oct. 12, 1912 |
| 558,396 | Great Britain | Jan. 4, 1944 |